United States Patent [19]
Ganz

[11] 3,938,648
[45] Feb. 17, 1976

[54] PACKAGE TRANSFER UNIT

[76] Inventor: Robert H. Ganz, 8 Ridge Crest Road, Saddle River, N.J. 07458

[22] Filed: June 21, 1974

[21] Appl. No.: 481,871

[52] U.S. Cl. .................................. 198/34; 198/76
[51] Int. Cl.² ........................................ B65G 47/26
[58] Field of Search ............................... 198/34, 76

[56] References Cited
UNITED STATES PATENTS

| | | | |
|---|---|---|---|
| 1,683,973 | 9/1928 | Heichert | 198/76 X |
| 2,144,717 | 1/1939 | Ettl | 198/76 X |
| 2,917,157 | 12/1959 | Fitzgerald | 198/34 |
| 3,323,634 | 6/1967 | Arvidson | 198/34 |

Primary Examiner—Richard A. Schacher
Attorney, Agent, or Firm—Diller, Brown, Ramik & Wight

[57] ABSTRACT

This disclosure relates to a transfer unit for transferring packages in the form of a film wrapped around a plurality of containers from a package forming or wrapping machine to a shrink tunnel unit, wherein the shrink tunnel unit has a conveyor which moves at a faster rate than a conveyor of the packaging machine. In order that partially formed packages may be transferred between the two conveyors, there has been provided a transfer unit in the form of two rollers spaced so as to receive articles arranged in one behind the other relationship, the two rollers being driven normally in accordance with the speed of the packaging machine conveyor and there being means for momentarily driving the rollers at the same general speed as the shrink tunnel unit conveyor, the changing of roller speed being automatically accomplished when the package being transferred is properly positioned relative thereto.

14 Claims, 5 Drawing Figures

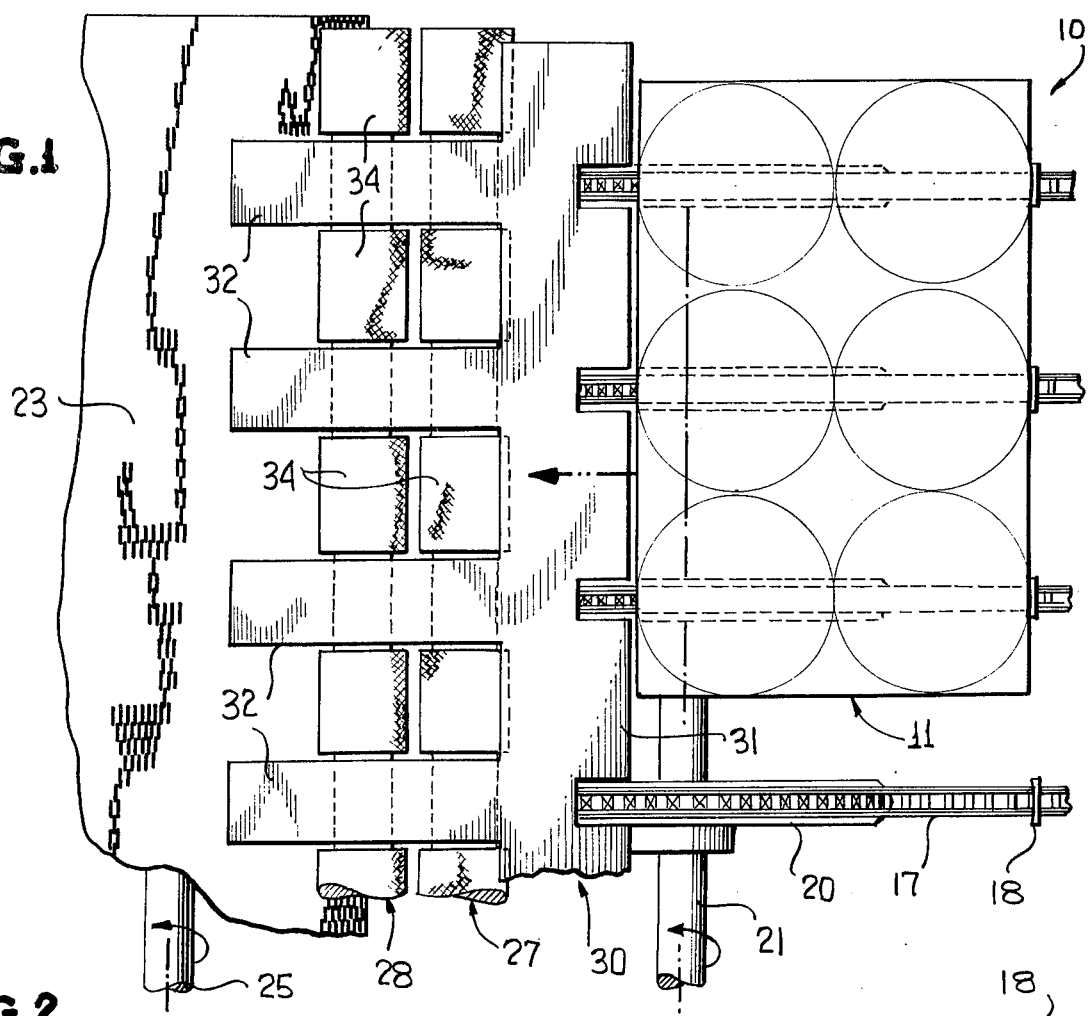
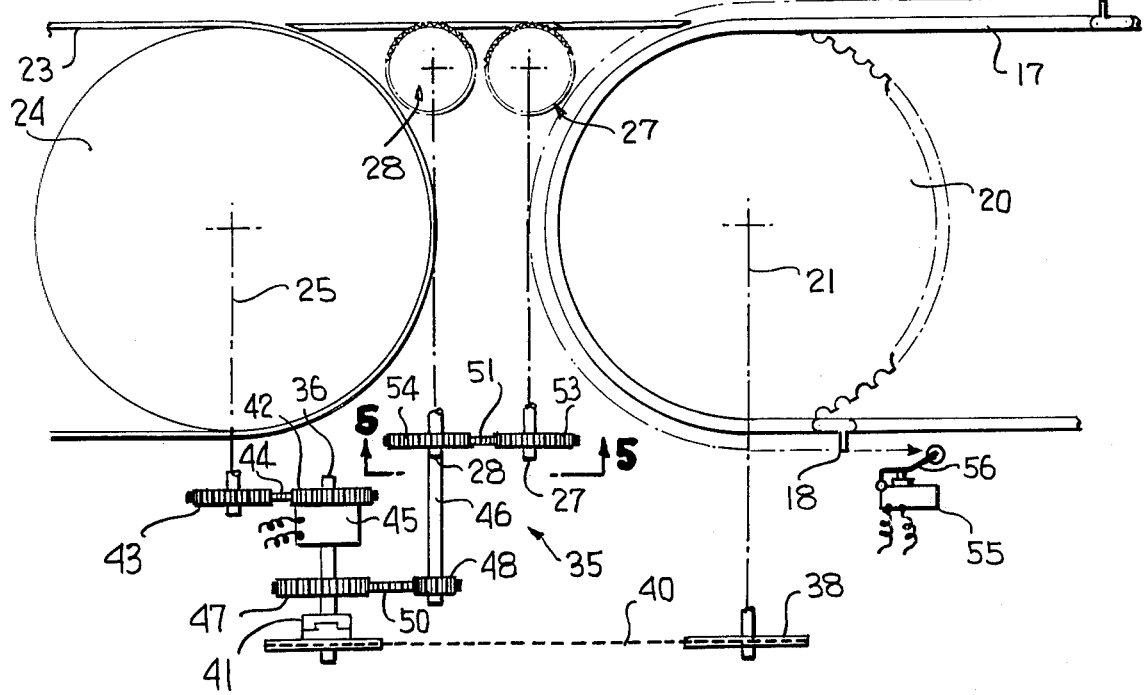

U.S. Patent  Feb 17, 1976  Sheet 2 of 2  3,938,648
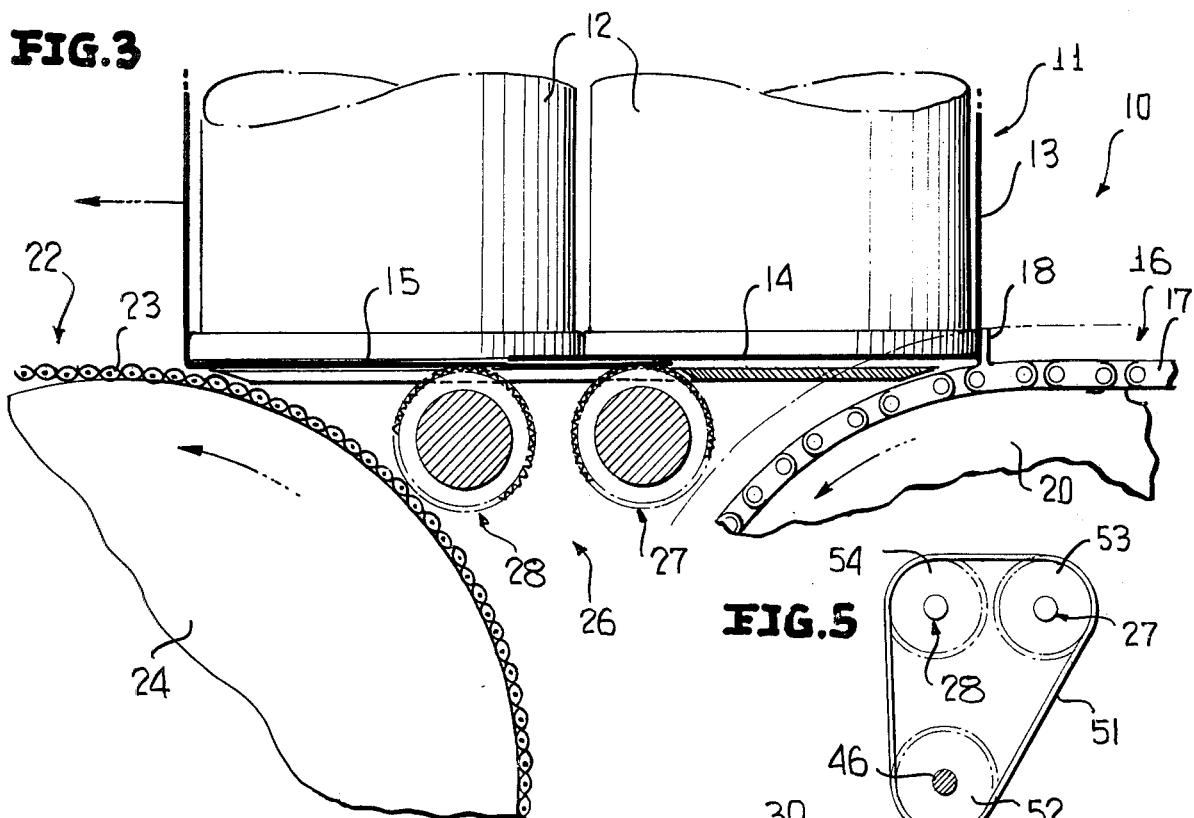
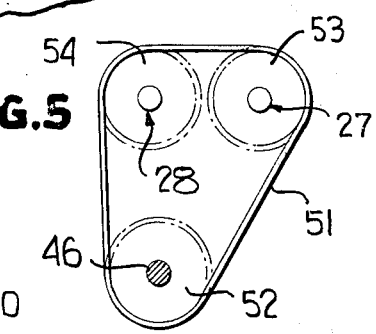
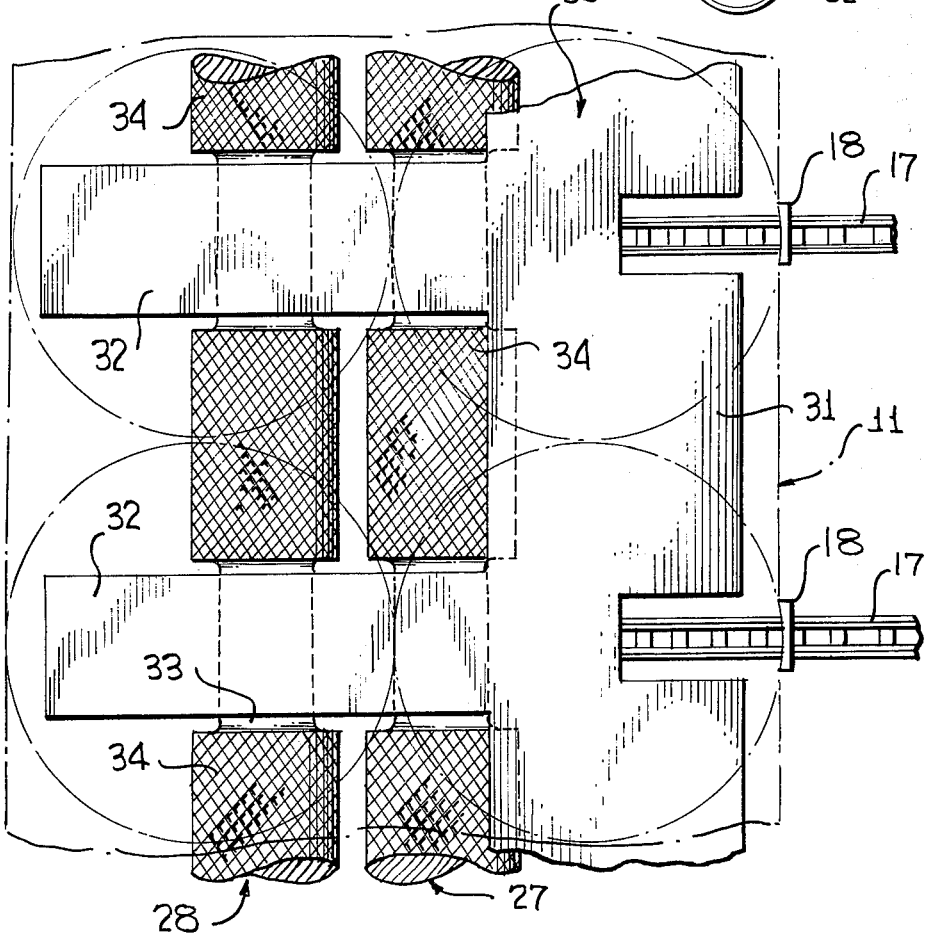

PACKAGE TRANSFER UNIT

This invention relates in general to new and useful improvements in conveying systems, and more particularly relates to a transfer unit which is positioned between the conveyor of a packaging machine of the film wrapping type and the conveyor of a shrink tunnel unit for accomplishing the transfer of the wrapped, but not sealed package from the packaging machine to the shrink tunnel unit without loosening the package.

This invention particularly relates to a packaging machine of the type disclosed in my U.S. Pat. No. 3,680,678 granted Aug. 1, 1972. In accordance with the disclosure of that machine, plastic film is wrapped around groups of containers and each wrapped group of containers is transferred from the packaging machine to a shrink tunnel unit before the film is sealed to itself. The groups of containers pass through the packaging machine in closely spaced relationship, but in order to provide for the proper heating of the film to effect both bonding and shrinking thereof, it is necessary that the groups of containers be more widely spaced as they pass through the shrink tunnel. Accordingly, it is necessary that the conveyor of the shrink tunnel move faster than the conveyor of the packaging machine.

In the past there has been a separate conveyor for transferring wrapped groups of containers from the conveyor of the packaging machine to the conveyor of the shrink tunnel. This transfer conveyor has been driven at the same general speed as the conveyor of the shrink tunnel with the result that the leading group of containers are momentarily pulled away from the trailing group of containers during the initial transfer. This has resulted in an undesired loosening of the packages.

In accordance with this invention, it is proposed to provide a transfer unit wherein the groups of containers which have been wrapped with the film are deliverd to a transfer unit which is operating at the same speed as the conveyor of the packaging machine and after the containers of the group are fully sealed on the transfer unit, the speed of movement of the transfer unit is rapidly accelerated to substantially that of the shrink tunnel conveyor in a manner wherein front and rear articles of a group are initially simultaneously accelerated and wherein at the end of the transfer the rear group of containers are forcing the front group of containers onto the shrink tunnel conveyor.

In order to accomplish the desired driving effect of the transfer unit, the transfer unit includes drive means which are normally driven from the wrapping machine conveyor but which drive means may be overdriven from the shrink tunnel conveyor momentarily so as to effect the rapid acceleration of the group of containers being transferred. In order to provide for this overdriving, the drive connection between the transfer unit and the conveyor of the packaging machine includes an overrunning clutch and the drive connection between the transfer unit and the shrink tunnel conveyor includes a selectively actuated clutch.

There is also provided control means for the selectively actuated clutch so that the selectively actuated clutch is actuated only when the containers of a group are properly positioned relative to the transfer rollers so as to effectively time the operation of the transfer unit and to produce the desired transfer.

With the above and other objects in view that will hereinafter appear, the nature of the invention will be more clearly understood by reference to the following detailed description, the appended claims and the several views illustrated in the accompanying drawings:

IN THE DRAWINGS

FIG. 1 is a schematic plan view of the packaging machine conveyor, the shrink tunnel conveyor and the transfer rollers and shows the relationship between the components thereof including a newly formed package which is to be transferred.

FIG. 2 is a schematic side elevational view of the conveyor arrangement of FIG. 1 and shows the drive for the transfer unit.

FIG. 3 is an enlarged schematic elevational view with parts broken away and shown in section and shows a wrapped group of containers about to be transferred from the packaging machine conveyor to the shrink tunnel conveyor.

FIG. 4 is an enlarged fragmentary plan view of the conveyors of FIG. 3 with the package being shown in phantom so as to illustrate the relationship of the package to the conveyors.

FIG. 5 is a schematic fragmentary elevational view taken generally along the line 5—5 of FIG. 2 and shows specifically the final drive for the transfer rollers.

Referring now to the drawings in detail, it will be seen that there are illustrated portions of a packaging machine which is generally identified by the numeral 10.

The packaging machine 10, which may be of the type disclosed in my aforementioned U.S. Pat. No. 3,680,678, is particularly adapted to package groups of articles wherein in each group the articles are arranged in transverse and longitudinal rows and are bound together as a group by plastic film wrapped thereabout. As is clearly shown in FIGS. 1 and 3, a typical package 11 may include six cans 12 which are arranged in three longitudinal rows and two transverse rows and wherein a sheet of film 13 is wrapped about the containers with the film wrap 13 having terminal panels 14 and 15 underlying the containers 12 and free edges thereof disposed in overlapped relation, the trailing portion of the leading panel 15 being disposed below the leading portion of the trailing panel 14.

The packaging machine includes a conveyor assembly, generally identified by the numeral 16, with the conveyor assembly 16 including at least one endless chain type conveyor 17 for each longitudinal row of containers and the conveyor chain 17 being provided at regularly spaced intervals with lugs 18, each lug 18 being adapted to engage the rearmost container of its respective row of containers and to push the associated longitudinal row of containers out of the packaging machine 10. As is best shown in FIG. 2, each conveyor chain 17 has the exit end thereof entrained over a sprocket 20, and the sprockets 20 are carried by a common shaft 21 for rotation in unison.

Each wrapped group of containers is delivered from the packaging machine 10 to a shrink tunnel unit, generally identified by the numeral 22. the shrink tunnel unit 22 includes an endless conveyor 23 which is preferably in the form of an endless screen, but could be in the form of a plurality of individual endless chains, and has the leading portion thereof suitably mounted on a drum 24 which includes a shaft 25. The conveyor 23 is driven as a faster speed than the conveyor chains 17 and functions to facilitate the spacing of groups of articles which have been packaged and to move the same into a shrink tunnel (not shown), as disclosed in my U.S. Pat. No. 3,680,678, for the dual purpose of bonding together the overlapped portions of the panels 14, 15 and for effecting shrinking of the film 13 about the containers 12.

It will be readily apparent from FIG. 3 that if the package 11 were moved directly from the conveyor assembly 16 onto the conveyor 23, since the conveyor 23 is moving at a faster surface speed than the conveyor assembly 16, the leading articles 12 would be advanced relative to the trailing articles 12 of the same group with the result that the package would loosen up and an improper final package would be formed. Therefore, in accordance with this invention, there has been provided a transfer unit, generally identified by the numeral 26, which will not only properly transfer the unsealed package 11 from the packaging machine 10 to the shrink tunnel assembly, but also will assure the maintaining of the tight condition of the package.

The transfer unit includes first and second transfer rollers 27, 28, which are disposed in closely adjacent side-by-side relationship between the conveyor unit 16 and the conveyor screen 23, as is clearly shown in FIG. 3. Each package 11 completed by the packaging machine 10 is transferred first onto the roller 27 and then onto the roller 28. The upper path of travel of the surface of each of the rollers 27, 28 lies in a plane substantially coextensive with the upper surface of the conveyor chain 17 and the conveyor screen 13.

With particular reference to FIGS. 3 and 4, it will be seen that a dead plate assembly, generally identified by the numeral 30 extends generally between the packaging machine 10 and the shrink tunnel unit 22. The dead plate assembly 30 includes rearwardly extending portions 31 which project rearwardly in between the conveyor chains 17, and forwardly extending portions 32 which extends transversely across the rollers 27, 28 into overlying relation with respect to the conveyor screen 23.

In order that the dead plate 30 may be at the proper elevation, the rollers 27, 28 are provided, generally in alignment with the conveyor chain 17, with reduced diameter portions 33. The forward dead plate portions 32 are positioned within the recesses defined by the reduced diameter roller portions 33, as is clearly illustrated in FIGS. 3 and 4. The portions of the rollers 27, 28 which are of full diameter are provided with a friction type surface 34 which may be in the form of knurling or which may be in the form of friction forming coating material.

In accordance with this invention, it is desired to normally drive the rollers 27, 28 at the same surface speed as the surface speed of the conveyor chains 17. However, at a predetermined time during the transfer of the packages 11 from the packaging machine 10 to the shrink tunnel assembly 22, it is desired to increase the surface speed of the rollers 27, 28 to substantially that or slightly greater than that of the conveyor screen 23. To this end there is provided a drive assembly for the rollers 27, 28 which is best illustrated in FIG. 2 and is identified generally by the numeral 35.

The drive assembly 35 includes a primary shaft 36 which is suitably mounted for rotation and which has rotatably mounted thereon a drive sprocket 37 which is driven from the shaft 21 by means of a sprocket 38 and a drive chain 40. The drive sprocket 37 is normally coupled to the primary shaft 36 in driving relation by means of a conventional type of overrunning clutch 41.

The primary shaft 36 also has mounted thereon for rotation a sprocket 42 which is coupled to a sprocket 43 carried by the conveyor shaft 25 by means of a drive chain 44. A remotely controllable clutch 45 selectively connects the sprocket 42 to the primary shaft 36 for rotating the primary shaft 36 at a speed greater than that effected by the sprocket 37. The illustrated clutch 45 is an electric clutch, but could utilize other types of actuations.

It will be readily apparent that the arrangement is such that the primary shaft 36 may normally be driven from the packaging machine 10 through the overrunning clutch 11 and that at such time as the clutch 45 is energized, the shaft 36 may be driven by the shaft 25 in an overriding manner with respect to the clutch 41.

An intermediate shaft 46 is driven from the primary shaft 36 by means of a drive sprocket 47, a driven sprocket 48 and a drive chain 50. The intermediate shaft 46, by way of a driven chain 51, simultaneously drives the rollers 27, 28 in the same direction and at the same surface speed. The manner in which this is accomplished is best illustrated schematically in FIG. 5 wherein it is shown that the intermediate shaft 46 is provided with a drive sprocket 52 and the rollers 27, 28 are provided with sprockets 53, 54, respectively, the drive chain 51 passing around all of the sprockets 52, 53, 54. Further, if desired, a further tensioning sprocket (not shown) may be incorporated in the drive shown in FIG. 5.

As is set forth above, it is desired that the rollers 27, 28 be driven at the same surface speed as that of the conveyor chains 17 until a preformed package 11 is in a predetermined positioned with respect to the rollers 27, 28. At that time, the clutch 45 is energized so as to effect the driving of the rollers 27, 28 at an elevated speed from the conveyor shaft 25. Any type of suitable control device may be utilized to control the precise time at which accelerated driving of the rollers 27, 28 is effected. However, for simplicity purposes there has been illustrated in FIG. 2 a control which includes a switch 55 which is coupled to the clutch 45 for controlling the operation thereof. The switch 55 is provided with a follower arrangement 56 which is engaged by lugs 18 of the conveyor chain 17. It will be appreciated that the lugs 18 and the switch arm and follower may be so interrelated wherein the clutch 45 will be energized for a predetermined length of time.

Referring once again to FIG. 3, it will be seen that a package which is to be transferred from the packaging machine 10 to the shrink tunnel assembly 22 is approaching a position wherein the rollers 27, 28 are to be driven at accelerated rate. It will be apparent that acceleration of the rollers 27, 28 should occur at a time wherein both rollers 27, 28 will simultaneously feed the two transverse rows of containers as well as the film 13 surrounding the same. Thus, as soon as the package 17 has advanced to the position wherein the feeding of the package 11 will be primarily through the trailing panel 14, so as to effect a tightening of the package as well as the transfer thereof, the speed of rotation of the rollers 27, 28 will be accelerated.

It will be readily apparent that initially the front row of containers 12 will be fed by the roller 28 while the rear row of containers will be fed by the roller 27. However, in a very short time the front row of containers will move off of the roller 28 onto the conveyor screen 23 and that all of the driving effect of the rollers 27, 28 on the package 11 will be with respect to the trailing group of containers. Inasmuch as the surface speed of the rollers 27, 28 is slightly greater than that of the conveyor 23, it will be seen that there will be a crowding together of the containers 12 together with a drawing of the panel 14 forwardly in a manner so as to not only facilitate the transfer of the package 11, but also to tighten up the package.

It is to be understood that various types of selectively actuated clutches may be utilized for the clutch 45 and that various types of control devices may further be utilized. However, it is essential that the rollers 27, 28 be accelerated only when the package 11 is in a predetermined position relative to the rollers 27, 28, this position being one slightly advanced to the left of that shown in FIG. 3.

It will be readily apparent from the foregoing that not only an efficient transfer of the package 11 is obtained, but also the transferring operation tends to increase the tightness of the package as opposed to decreasing the same as occurred previously.

Although only a preferred embodiment and environment of utilization has been specifically defined herein, it is to be understood that minor variations may be made in the transfer device without departing from the spirit and scope of the invention, as defined by the appended claims.

I claim:

1. An accelerating transfer unit for transferring articles from a first conveyor to a faster moving second conveyor, said accelerating transfer unit comprising a conveying member and drive means for selectively driving said conveying member at first and second surface speeds, said drive means including a first drive unit incorporating first drive element means for coupling to a first conveyor drive for the first conveyor to be driven at a first speed, overrunning clutch means between said first drive element means and said conveying member to drive said conveying member at a first speed, and a second drive unit incorporating second drive element means for coupling to a second conveyor drive for the second conveyor to be driven at a second speed, and selectively actuated clutch means for coupling said second drive element means to said conveying member in driving relation.

2. The transfer unit of claim 1 wherein said conveying member is in the form of a roller.

3. The transfer unit of claim 1 wherein said conveying member is in the form of a pair of rollers disposed in side-by-side spaced relation.

4. The transfer unit of claim 1 wherein said drive means include a primary drive shaft and said first and second drive element means and said overrunning and selectively actuated clutch means are mounted on said primary drive shaft for selectively driving the same.

5. The transfer unit of claim 1 together with control means for automatically actuating said selectively actuated clutch means in accordance with the position of a first conveyor.

6. A conveyor system comprising a first conveyor, a second conveyor in adjacent aligned relation and having means for operating at a higher surface speed than said first conveyor, and a transfer unit for transferring articles from said first conveyor to said second conveyor, said transfer unit including a conveying member disposed intermediate said first and second conveyors and drive means for selectively driving said conveying member at first and second surface speeds generally corresponding to the surface speeds of said first and second conveyors, said drive means including independent clutch controlled first and second drives for selectively coupling said first and second conveyors, respectively, to said conveying member.

7. the conveyor system of claim 6 wherein said first drive includes an overrunning clutch and said second drive includes a selectively actuated clutch.

8. The conveyor system of claim 7 together with control means for automatically actuating said selectively actuated clutch in accordance with the operation of said first conveyor.

9. The conveyor system of claim 7 wherein said first conveyor includes means for locating thereon articles being conveyed thereby, and said means includes control means for automatically actuating said selectively actuated clutch in accordance with the position of said first conveyor.

10. The conveyor system of claim 7 wherein said conveyor system is particularly adapted to convey article packages wherein there are at least two articles one behind the other in the direction of movement of said conveyors, and said drive means includes control means for automatically actuating said selectively actuated clutch at a time when the articles of each article package are in conveyable engagement with said conveying member.

11. The conveying system of claim 10 wherein said conveying member is in the form of a pair of rollers disposed in side-by-side spaced relation.

12. The conveying system of claim 11 wherein said first conveyor is part of a film wrapping machine and said second conveyor is part of a shrink tunnel unit, and said rollers engage each article package in a manner to retain the tightness of the package during the transfer thereof between the wrapping machine and the shrink tunnel unit.

13. The conveying system of claim 11 wherein upper surfaces of said rollers lie in a plane substantially coextensive with upper surfaces of said conveyors.

14. The conveyor system of claim 11 wherein said controls are operable to actuate said selectively actuated clutch at a time when a leading article of a package has passed a first of said rollers and is engaged with a second of said rollers, and a trailing article of the package is engaged with said first roller.

* * * * *